United States Patent
Nomura et al.

(10) Patent No.: US 11,706,287 B2
(45) Date of Patent: *Jul. 18, 2023

(54) INFORMATION PROCESSING SYSTEM AND APPLICATION SERVICES DISTRIBUTION METHOD IN INFORMATION PROCESSING SYSTEM

(71) Applicant: HITACHI, LTD., Tokyo (JP)

(72) Inventors: Shimpei Nomura, Tokyo (JP); Mitsuo Hayasaka, Tokyo (JP); Kazumasa Matsubara, Tokyo (JP); Eiichi Inoue, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,759

(22) Filed: Jul. 5, 2022

(65) Prior Publication Data

US 2022/0337659 A1 Oct. 20, 2022

Related U.S. Application Data

(63) Continuation of application No. 17/474,720, filed on Sep. 14, 2021, now Pat. No. 11,412,034.

(30) Foreign Application Priority Data

Dec. 24, 2020 (JP) .................................. 2020-214706

(51) Int. Cl.
*G06F 15/16* (2006.01)
*H04L 67/10* (2022.01)

(52) U.S. Cl.
CPC ................... *H04L 67/10* (2013.01)

(58) Field of Classification Search
CPC ....................................................... H04L 67/10
See application file for complete search history.

(56) References Cited

U.S. PATENT DOCUMENTS

| | | | |
|---|---|---|---|
| 11,032,164 B1 * | 6/2021 | Rothschild | H04L 41/5025 |
| 2012/0011254 A1 * | 1/2012 | Jamjoom | G06F 9/4856 |
| | | | 709/226 |
| 2013/0166712 A1 | 6/2013 | Chandramouli et al. | |
| 2019/0102717 A1 * | 4/2019 | Wu | G06Q 10/06375 |
| 2019/0363954 A1 * | 11/2019 | Sharma | G06F 9/5027 |
| 2021/0312287 A1 * | 10/2021 | Rommel | G06F 16/51 |

* cited by examiner

*Primary Examiner* — Padma Mundur

(74) *Attorney, Agent, or Firm* — Volpe Koenig

(57) ABSTRACT

An information processing system including Application Platform capable of communicating with Edge1 connected to each other to be able to communicate each other, in which Application Platform includes a second processor, information on microservices and data possessed by Edge1, and performance information describing the performance of Edge1, and the second processor uses predetermined data to combine a plurality of predetermined microservices and causes Edge1 to execute them in a predetermined order. When executing the application, microservices and data are moved between Edge1 based on the information of the microservices and the data possessed by Edge1, and the performance information.

7 Claims, 22 Drawing Sheets

FIG. 2

WIDE AREA DISTRIBUTED METADATA MANAGEMENT TABLE (BASE: Edge1) 25

| DATA NAME | DATA HOLDING (Datalake) LOCATION | DATA SIZE | DATA SUMMARY | SNAPSHOT DATE | REPLICA INFORMATION | DOMESTIC MOVEMENT POSSIBILITY | OVERSEAS MOVEMENT POSSIBILITY |
|---|---|---|---|---|---|---|---|
| dataA | http://datalakeEdge1 | xxx | FILE A | | | YES | NO |
| dataA.snapshot1 | http://datalakeEdge1 | xxx | FILE A SNAPSHOT 1 | 20200601 | | YES | NO |
| dataA.snapshot2 | http://datalakeEdge1 | xxx | FILE A SNAPSHOT 2 | 20200501 | | YES | NO |
| dataB | http://datalakeEdge1 | xxx | FILE B | | | YES | YES |
| dataB.snapshot1 | http://datalakeEdge1 | xxx | FILE B SNAPSHOT 1 | 20200601 | | YES | YES |
| dataB.snapshot2 | http://datalakeEdge1 | xxx | FILE B SNAPSHOT 2 | 20200501 | | YES | YES |
| dataC.snapshot1 | http://datalakeEdge1 | xxx | REPLICA OF FILE C SNAPSHOT 1 | 20200601 | On-Prem1 | YES | NO |
| ... | ... | ... | ... | ... | ... | ... | ... |
| Proc1(container) | http://datalakeEdge1 | xxx | CONTAINER OF PROCESS 1 | | | NO | NO |
| Proc1(src) | http://datalakeEdge1 | xxx | SOURCE CODE OF PROCESS 1 | | | NO | NO |
| Proc2(container) | http://datalakeEdge1 | xxx | CONTAINER OF PROCESS 2 | | | YES | NO |
| Proc2(src) | http://datalakeEdge1 | xxx | SOURCE CODE OF PROCESS 2 | | | YES | NO |
| Proc3(container) | http://datalakeEdge1 | xxx | CONTAINER OF PROCESS 3 | | On-Prem1 | YES | NO |
| ... | ... | ... | ... | ... | ... | ... | ... |
| 25a | 25b | 25c | 25d | 25e | 25f | 25g | 25h |

FIG. 3

WIDE AREA DISTRIBUTED METADATA MANAGEMENT TABLE (BASE: On-Prem1) 35

| DATA NAME | DATA HOLDING LOCATION | DATA SIZE | DATA SUMMARY | SNAPSHOT DATE | REPLICA INFORMATION | DOMESTIC MOVEMENT POSSIBILITY | OVERSEAS MOVEMENT POSSIBILITY |
|---|---|---|---|---|---|---|---|
| dataC | http://datalakeOn-Prem1 | xxx | FILE C | | | YES | NO |
| dataC.snapshot1 | http://datalakeOn-Prem1 | xxx | FILE C SNAPSHOT 1 | 20200601 | Edge1 | YES | NO |
| dataC.snapshot2 | http://datalakeOn-Prem1 | xxx | FILE C SNAPSHOT 2 | 20200501 | | YES | NO |
| ... | ... | ... | ... | ... | ... | | |
| Proc3(container) | http://datalakeOn-Prem1 | xxx | CONTAINER OF PROCESS 3 | | | YES | NO |
| Proc3(src) | http://datalakeOn-Prem1 | xxx | SOURCE CODE OF PROCESS 3 | | | YES | NO |
| ... | ... | ... | ... | ... | ... | | |
| 35a | 35b | 35c | 35d | 35e | 35f | 35g | 35h |

FIG. 4

WIDE AREA DISTRIBUTED METADATA MANAGEMENT TABLE
(BASE: PubCloud1)   45

| DATA NAME | DATA HOLDING LOCATION | DATA SIZE | DATA SUMMARY | SNAPSHOT DATE | REPLICA INFORMATION | DOMESTIC MOVEMENT POSSIBILITY | OVERSEAS MOVEMENT POSSIBILITY |
|---|---|---|---|---|---|---|---|
| dataD | http://datalakePubCloud1 | xxx | FILE D | | | YES | NO |
| dataD.snapshot1 | http://datalakeOn-Prem1 | xxx | FILE D SNAPSHOT 1 | 20200601 | | YES | NO |
| dataD.snapshot2 | http://datalakeOn-Prem1 | xxx | FILE D SNAPSHOT 2 | 20200501 | | YES | NO |
| ... | ... | ... | ... | ... | ... | | |
| Proc4(container) | http://datalakeOn-Prem1 | xxx | CONTAINER OF PROCESS 4 | | | YES | NO |
| Proc4(src) | http://datalakeOn-Prem1 | xxx | SOURCE CODE OF PROCESS 4 | | | YES | NO |
| ... | ... | ... | | | | | |

WIDE AREA DISTRIBUTED METADATA MANAGEMENT TABLE
(AGGREGATION RESULTS OF ALL BASES)   61

| BASE NAME | DATA NAME | DATA HOLDING LOCATION | DATA SIZE | DATA SUMMARY | SNAPSHOT DATE | REPLICA INFORMATION | DOMESTIC MOVEMENT POSSIBILITY | OVERSEAS MOVEMENT POSSIBILITY |
|---|---|---|---|---|---|---|---|---|
| Edge1 | dataA | http://datalakeEdge1 | xxx | ... | | | YES | NO |
| Edge1 | dataA.snapshot1 | http://datalakeEdge1 | xxx | | 20200601 | | YES | NO |
| Edge1 | dataA.snapshot2 | http://datalakeEdge1 | xxx | | 20200501 | | YES | NO |
| Edge1 | dataB | http://datalakeEdge1 | xxx | | | | YES | YES |
| Edge1 | dataB.snapshot1 | http://datalakeEdge1 | xxx | | 20200601 | | YES | YES |
| Edge1 | dataB.snapshot2 | http://datalakeEdge1 | xxx | | 20200501 | | YES | YES |
| Edge1 | dataC.snapshot1 | http://datalakeEdge1 | xxx | | 20200601 | On-Prem1 | YES | NO |
| On-Prem1 | dataC | http://datalakeOn-Prem1 | xxx | | | | YES | NO |
| On-Prem1 | dataC.snapshot1 | http://datalakeOn-Prem1 | xxx | | 20200601 | Edge1 | YES | NO |
| On-Prem1 | dataC.snapshot2 | http://datalakeOn-Prem1 | xxx | | 20200501 | | YES | NO |
| PubCloud1 | dataD | http://datalakePub1 | xxx | | | | YES | NO |
| ... | ... | ... | ... | ... | ... | ... | ... | ... |
| Edge1 | Proc1(container) | http://datalakeEdge1 | xxx | | | | NO | NO |
| Edge1 | Proc1(src) | http://datalakeEdge1 | xxx | | | | NO | NO |
| Edge1 | Proc2(container) | http://datalakeEdge1 | xxx | | | | YES | NO |
| Edge1 | Proc2(src) | http://datalakeEdge1 | xxx | | | | YES | NO |
| Edge1 | Proc3(container) | http://datalakeOn-Prem1 | xxx | | | On-Prem1 | YES | NO |
| Edge1 | Proc3(src) | http://datalakeOn-Prem1 | xxx | | | On-Prem1 | YES | NO |
| On-Prem1 | Proc3(container) | http://datalakeOn-Prem1 | xxx | | | Edge1 | YES | NO |
| On-Prem1 | Proc3(src) | http://datalakeOn-Prem1 | xxx | | | Edge1 | YES | NO |
| ... | ... | ... | ... | ... | ... | ... | ... | ... |

USER DEFINED PROCESSING FLOW
                                                                    70

| APPLICATION ID | INPUT DATA TRANSFER SOURCE APPLICATION ID | OUTPUT DATA TRANSFER DESTINATION APPLICATION ID | USAGE DATA ID |
|---|---|---|---|
| A1 | - | A3 | D1 |
| A2 | - | A3 | D2 |
| A3 | A1, A2 | A4 | D3 |
| A4 | A3 | A5 | D4 |
| A5 | A4 | - | D5 |

APPLICATION ID-APPLICATION NAME CONVERSION TABLE
                                            54

| APPLICATION ID | APPLICATION NAME |
|---|---|
| A1 | Proc1 |
| A2 | Proc2 |
| A3 | Proc3 |
| A4 | Proc4 |
| A5 | Proc5 |
|  |  |
|  | ... |

DATA ID–DATA NAME CONVERSION TABLE
                                55

| DATA ID | DATA NAME |
|---|---|
| D1 | data1 |
| D2 | data2 |
| D3 | data3 |
| D4 | data4 |
| D5 | data5 |
|  |  |
|  | ... |

APPLICATION DATA MANAGEMENT TABLE 56

| FLOW 1 | URL (DATA CATALOG URL) | DOMESTIC MOVEMENT POSSIBILITY | OVERSEAS MOVEMENT POSSIBILITY | REPLICA DESTINATION | ... |
|---|---|---|---|---|---|
| dataA | http://locationEdge1 | YES | NO | | ... |
| Proc1 | http://locationEdge1 | NO | NO | | ... |
| dataB | http://locationEdge1 | YES | YES | | ... |
| Proc2 | http://locationEdge1 | YES | NO | | ... |
| dataC | http://locationOnPrem1 | YES | NO | locationEdge1 | ... |
| Proc3 | http://locationOnPrem1 | YES | NO | locationEdge1 | ... |
| dataD | http://locationPub1 | YES | YES | | ... |
| Proc4 | http://locationPub1 | YES | YES | | ... |
| dataE | http://locationPub1 | YES | YES | | ... |
| Proc5 | http://locationPub1 | YES | YES | | ... |
| ... | ... | ... | ... | ... | ... |

APPLICATION OPERATION RECORD HISTORY TABLE 57

| APPLICATION | DATA | EXECUTION BASE | QoS SETTING | EXECUTION AVERAGE TIME [s] | QoS AVERAGE COST [s] | NUMBER OF EXECUTIONS | LAST EXECUTION DATE AND TIME | AVERAGE Read AMOUNT [Byte] | AVERAGE Write AMOUNT [Byte] | ACCESS PATTERN TENDENCY |
|---|---|---|---|---|---|---|---|---|---|---|
| Proc1 | dataA.snapshot1 | Edge1 | Gold | T1 | 0 | 10 | yyyy/mm/dd | 300 | 20 | Sequential |
| Proc1 | dataA.snapshot1 | Edge1 | Silver | T2 | 0 | 5 | yyyy/mm/dd | 400 | 30 | Sequential |
| Proc1 | dataA.snapshot1 | Edge1 | Bronze | T3 | 0 | 3 | yyyy/mm/dd | 400 | 30 | Sequential |
| Proc1 | dataA.snapshot1 | Edge1 | Best-Effot | T4 | 0 | 20 | yyyy/mm/dd | 350 | 25 | Sequential |
| Proc1 | dataA.snapshot1 | PubCloud1 | Gold | T5 | P1sxT5 | 5 | yyyy/mm/dd | 200 | 15 | Sequential |
| Proc1 | dataA.snapshot1 | PubCloud1 | Silver | T6 | P1sxT6 | 4 | yyyy/mm/dd | 300 | 20 | Sequential |
| Proc1 | dataA.snapshot1 | PubCloud1 | Bronze | T7 | P1bxT7 | 8 | yyyy/mm/dd | 300 | 15 | Sequential |
| Proc1 | dataA.snapshot1 | PubCloud1 | Best-Effot | T8 | P1exT8 | 20 | yyyy/mm/dd | 400 | 30 | Sequential |
| Proc1 | dataB.snapshot2 | Edge1 | Best-Effot | T9 | 0 | 1 | yyyy/mm/dd | 100 | 5 | Sequential |
| Proc2 | dataB.snapshot1 | Edge1 | Best-Effot | T10 | 0 | 2 | yyyy/mm/dd | 0 | 300 | Random |
| ... | ... | ... | ... | ... | ... | ... | ... | | | |

RESOURCE AND PERFORMANCE MANAGEMENT TABLE 58

| BASE | CPU [Hz] | NUMBER OF Cores | MEM [GB] | CPU UTILIZATION RATE | MEMORY USAGE RATE | POWER CONSUMP-TION [kWh] | SLA [%] | LOCATION | RESOURCE COST [$/time] | | | | API CHARGE | DATA TRANSFER COST (in) [$/GB] | DATA TRANSFER COST (out) [$/GB] |
|---|---|---|---|---|---|---|---|---|---|---|---|---|---|---|---|
| | | | | | | | | | Gold | Silver | Bronze | Best-Effot | | | |
| Edge1 | | | | 30 | | 20 | 98.00 | JP | 0 | 0 | 0 | 0 | Cc | 0 | 0 |
| On-Prem1 | | | | 30 | | 50 | 99.00 | JP | 0 | 0 | 0 | 0 | Vvv | 0 | 0 |
| PubCloud1 | | | | 80 | | 20 | 99.90 | JP | 3.96 | 2.96 | 1.96 | 0 | Bbb | 0 | 0.09 |
| PubCloud2 | | | | 10 | | 15 | 99.90 | US | 3.06 | 2.06 | 1.06 | 0 | nnn | 0.05 | 0.004 |
| ... | ... | ... | ... | ... | ... | ... | ... | ... | ... | ... | ... | ... | ... | ... | ... |

WIDE AREA TABLE 59

| network bandwidth [MB/s] | Edge1 | Edge2 | ... | On-Prem1 | On-Prem2 | ... | PubCloud1 | PubCloud2 | ... |
|---|---|---|---|---|---|---|---|---|---|
| Host | 20 | 30 | ... | 40 | 40 | ... | 10 | 10 | ... |
| Edge1 | 125 | 10 | ... | 20 | 10 | ... | 5 | 3 | ... |
| Edge2 | 10 | 125 | ... | 20 | 10 | ... | 5 | 3 | ... |
| ... | ... | ... | ... | ... | ... | ... | ... | ... | ... |
| On-Prem1 | 20 | 20 | ... | 125 | 40 | ... | 10 | 5 | ... |
| On-Prem2 | 10 | 10 | ... | 40 | 125 | ... | 10 | 5 | ... |
| ... | ... | ... | ... | ... | ... | ... | ... | ... | ... |
| PubCloud1 | 5 | 5 | ... | 10 | 10 | ... | 125 | 12 | ... |
| PubCloud2 | 3 | 3 | ... | 5 | 5 | ... | 12 | 125 | ... |
| ... | ... | ... | ... | ... | ... | ... | ... | ... | ... |

FIG. 13

LATENCY TABLE 62

| network lantency [ms] | Edge1 | Edge2 | ... | On-Prem1 | On-Prem2 | ... | PubCloud1 | PubCloud2 | ... |
|---|---|---|---|---|---|---|---|---|---|
| Host | 20 | 15 | ... | 10 | 10 | ... | 100 | 100 | ... |
| Edge1 | 1 | 30 | ... | 15 | 20 | ... | 100 | 150 | ... |
| Edge2 | 30 | 1 | ... | 15 | 20 | ... | 100 | 150 | ... |
| ... | ... | ... | ... | ... | ... | ... | ... | ... | ... |
| On-Prem1 | 15 | 15 | ... | 1 | 10 | ... | 100 | 150 | ... |
| On-Prem2 | 20 | 20 | ... | 10 | 1 | ... | 100 | 150 | ... |
| ... | ... | ... | ... | ... | ... | ... | ... | ... | ... |
| PubCloud1 | 100 | 100 | ... | 100 | 100 | ... | 1 | 100 | ... |
| PubCloud2 | 150 | 150 | ... | 150 | 150 | ... | 100 | 1 | ... |
| ... | ... | ... | ... | ... | ... | ... | ... | ... | ... |

FIG. 14

POLICY MANAGEMENT TABLE 60

| FLOW NAME | POLICY 0 | POLICY 1 | POLICY 2 | ... |
|---|---|---|---|---|
| FLOW 1 | PERFORMANCE (LATENCY) EMPHASIS (MINIMUM NUMBER OF BASES) | | | |
| FLOW 2 | PERFORMANCE (CPU NECK) EMPHASIS | PREPARATION (DATA AND APPLICATION MOVEMENT) MINIMUM TIME EMPHASIS | PERFORMANCE (LATENCY) EMPHASIS (MINIMUM NUMBER OF BASES) | ... |
| FLOW 3 | COST MINIMIZATION EMPHASIS | | | |
| FLOW 4 | QoS EMPHASIS (PROCESSING TIME WITHIN xxx) | | | ... |
| FLOW 5 | ENERGY SAVING EMPHASIS | | | |
| ... | ... | ... | ... | ... |

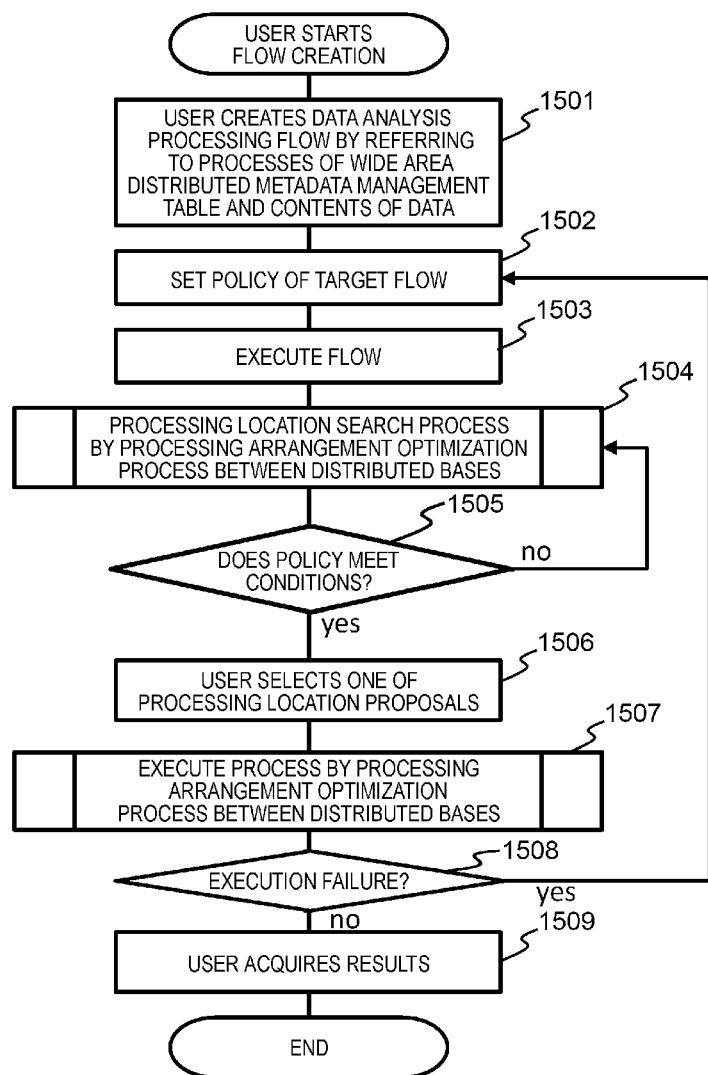

FIG. 21

PROCESSING LOCATION COMBINATION TABLE  80

| # | dataA + Proc1 | dataB + Proc2 | dataC + Proc3 | dataD + Proc4 | dataE + Proc5 |
|---|---|---|---|---|---|
| 1 | Edge1 | Edge1 | Edge1 | Edge1 | Edge1 |
| 2 | Edge1 | On-Prem1 | On-Prem1 | On-Prem1 | On-Prem1 |
| 3 | Edge1 | PubCloud1 | PubCloud1 | PubCloud1 | PubCloud1 |
| 4 | Edge1 | Edge1 | Edge1 | PubCloud2 | PubCloud2 |
| ... | ... | ... | ... | ... | ... |
| 144 | Edge1 | On-Prem1 | PubCloud1 | PubCloud2 | PubCloud2 |

FIG. 22

PROCESSING LOCATION COMBINATION TABLE  80

| # | dataA + Proc1 | dataB + Proc2 | dataC + Proc3 | dataD + Proc4 | dataE + Proc5 | NUMBER OF EXECUTION BASES |
|---|---|---|---|---|---|---|
| 1 | Edge1 | Edge1 | Edge1 | Edge1 | Edge1 | 1 |
| 2 | Edge1 | On-Prem1 | On-Prem1 | On-Prem1 | On-Prem1 | 2 |
| 3 | Edge1 | PubCloud1 | PubCloud1 | PubCloud1 | PubCloud1 | 2 |
| 4 | Edge1 | Edge1 | Edge1 | PubCloud2 | PubCloud2 | 2 |
| ... | ... | ... | ... | ... | ... | ... |
| 143 | Edge1 | On-Prem1 | PubCloud1 | PubCloud2 | PubCloud1 | 5 |
| 144 | Edge1 | On-Prem1 | PubCloud1 | PubCloud2 | PubCloud2 | 4 |

FIG. 23

APPLICATION AND DATA MANAGEMENT TABLE OF FLOW 2    56

| FLOW 2 | URL (DATA CATALOG URL) | DOMESTIC MOVEMENT POSSIBILITY | OVERSEAS MOVEMENT POSSIBILITY | REPLICA DESTINATION | ... |
|---|---|---|---|---|---|
| dataA | http://locationEdge1 | YES | NO | | ... |
| Proc1 | http://locationEdge1 | NO | NO | | ... |
| dataB | http://locationEdge1 | YES | YES | | ... |
| Proc2 | http://locationEdge1 | YES | NO | | ... |
| dataC | http://locationOnPrem1 | YES | NO | | ... |
| Proc3 | http://locationOnPrem1 | YES | NO | | ... |
| dataD | http://locationOnPrem1 | YES | YES | | ... |
| Proc4 | http://locationOnPrem1 | YES | YES | | ... |
| dataE | http://locationPub1 | YES | NO | | ... |
| Proc5 | http://locationPub1 | YES | NO | | ... |
| dataF | http://locationPub1 | YES | YES | | ... |
| Proc6 | http://locationPub1 | YES | YES | | ... |
| ... | ... | ... | ... | ... | ... |

PROCESSING LOCATION COMBINATION TABLE  80

| # | dataA + Proc1 | dataB + Proc2 | dataC + Proc3 | dataD + Proc4 | dataE + Proc5 | dataF + Proc6 | ESTIMATED APPLICATION EXECUTION TIME [s] | ESTIMATED MOVEMENT TIME [s] | TOTAL ESTIMATED TIME [s] | NUMBER OF EXECUTION BASES |
|---|---|---|---|---|---|---|---|---|---|---|
| 1 | Edge1 | Edge1 | Edge1 | PubCloud1 | PubCloud1 | PubCloud1 | 266.7 | 41.7 | 308.3 | 2 |
| 2 | Edge1 | Edge1 | Edge1 | PubCloud2 | PubCloud1 | PubCloud1 | 266.7 | 55.0 | 321.7 | 3 |
| 3 | Edge1 | Edge1 | Edge1 | Edge1 | PubCloud1 | PubCloud1 | 288.9 | 35.0 | 323.9 | 2 |
| 4 | Edge1 | Edge1 | PubCloud1 | PubCloud1 | PubCloud1 | PubCloud1 | 250.0 | 86.7 | 336.7 | 2 |
| 5 | Edge1 | PubCloud1 | Edge1 | PubCloud1 | PubCloud1 | PubCloud1 | 255.6 | 81.7 | 337.2 | 4 |
| 6 | Edge1 | Edge1 | PubCloud1 | PubCloud2 | PubCloud1 | PubCloud1 | 250.0 | 100.0 | 350.0 | 4 |
| 7 | Edge1 | PubCloud1 | Edge1 | PubCloud2 | PubCloud1 | PubCloud1 | 255.6 | 95.0 | 350.6 | 5 |
| ... | ... | ... | ... | ... | ... | ... | ... | ... | ... | ... |

FIG. 25

APPLICATION AND DATA MANAGEMENT TABLE OF FLOW 3   56

| FLOW 3 | URL (DATA CATALOG URL) | DOMESTIC MOVEMENT POSSIBILITY | OVERSEAS MOVEMENT POSSIBILITY | REPLICA DESTINATION | ... |
|---|---|---|---|---|---|
| dataA | http://locationEdge1 | YES | NO | | ... |
| Proc1 | http://locationEdge1 | NO | NO | | ... |
| dataB | http://locationEdge1 | YES | YES | | ... |
| Proc2 | http://locationEdge1 | YES | NO | | ... |
| dataC | http://locationOnPrem1 | YES | NO | | ... |
| Proc3 | http://locationOnPrem1 | YES | NO | | ... |
| dataD | http://locationPub1 | YES | YES | | ... |
| Proc4 | http://locationPub1 | NO | NO | | ... |
| dataE | http://locationPub2 | YES | YES | | ... |
| Proc5 | http://locationPub2 | YES | YES | | ... |
| ... | ... | ... | ... | ... | ... |

PROCESSING LOCATION COMBINATION TABLE
80

| # | dataA + Proc1 | dataB + Proc2 | dataC + Proc3 | dataD + Proc4 | dataE + Proc5 | PROCESS DATA MOVEMENT COST [$] | INFRASTRU-CTURE USAGE COST [$] | PROCESS CONTROL API CHARGE [$] | ESTIMATED TOTAL COST [$] |
|---|---|---|---|---|---|---|---|---|---|
| 1 | Edge1 | Edge1 | Edge1 | PubCloud1 | Edge1 | 0.9 | 1 | 0.05 | 1.95 |
| 2 | Edge1 | Edge1 | Edge1 | PubCloud1 | On-Prem1 | 0.9 | 1 | 0.05 | 1.95 |
| 3 | Edge1 | Edge1 | Edge1 | PubCloud1 | PubCloud1 | 0 | 1 | 0.05 | 1.05 |
| 4 | Edge1 | Edge1 | Edge1 | PubCloud1 | PubCloud2 | 1.4 | 1 | 0.05 | 2.45 |
| 5 | Edge1 | Edge1 | On-Prem1 | PubCloud1 | Edge1 | 0.9 | 1 | 0.05 | 1.95 |
| 6 | Edge1 | Edge1 | On-Prem1 | PubCloud1 | On-Prem1 | 0.9 | 1 | 0.05 | 1.95 |
| 7 | Edge1 | Edge1 | On-Prem1 | PubCloud1 | PubCloud1 | 0 | 1 | 0.05 | 1.05 |
| 8 | Edge1 | Edge1 | On-Prem1 | PubCloud1 | PubCloud2 | 1.4 | 1 | 0.05 | 2.45 |
| ... | ... | ... | ... | ... | ... | ... | ... | ... | ... |
| 36 | Edge1 | PubCloud1 | PubCloud1 | PubCloud1 | PubCloud2 | 1.4 | 1 | 0.05 | 2.45 |

FIG. 27

PROCESSING LOCATION COMBINATION TABLE
80

| # | dataA + Proc1 | dataB + Proc2 | dataC + Proc3 | dataD + Proc4 | dataE + Proc5 | ESTIMATED APPLICATION EXECUTION TIME [s] | ESTIMATED QoS COST [$] |
|---|---|---|---|---|---|---|---|
| 1 | Edge1(Gold) | Edge1(Gold) | Edge1(Gold) | Edge1(Gold) | Edge1(Gold) | 40 | 0 |
| 2 | Edge1(Gold) | Edge1(Gold) | Edge1(Gold) | Edge1(Gold) | Edge1(Silver) | 45 | 0 |
| ... | ... | ... | ... | ... | ... | ... | ... |
| n1 | Edge1(Gold) | Edge1(Gold) | PubCloud1(Gold) | PubCloud1(BE) | PubCloud2(Gold) | 38 | 6.06 |
| n2 | Edge1(Gold) | Edge1(Gold) | PubCloud1(Gold) | PubCloud1(BE) | PubCloud2(Silver) | 60 | 5.06 |
| n3 | Edge1(Gold) | Edge1(Gold) | PubCloud1(Gold) | PubCloud1(BE) | PubCloud2(Bronze) | 70 | 4.56 |
| n4 | Edge1(Gold) | Edge1(Gold) | PubCloud1(Gold) | PubCloud1(BE) | PubCloud2(BE) | 80 | 3.96 |
| ... | ... | ... | ... | ... | ... | ... | ... |
| xxx | Edge1(BE) | PubCloud1(BE) | PubCloud1(BE) | PubCloud2(BE) | PubCloud2(BE) | 120 | 0 |

BE: Best-Effort

FIG. 30

PROCESSING LOCATION COMBINATION TABLE 80

| # | dataA + Proc1 | dataB + Proc2 | dataC + Proc3 | dataD + Proc4 | dataE + Proc5 | ESTIMATED POWER CONSUMPTION [kW] |
|---|---|---|---|---|---|---|
| 1 | Edge1 | PubCloud1 | PubCloud1 | PubCloud2 | PubCloud2 | 0.72 |
| 2 | Edge1 | Edge1 | PubCloud1 | PubCloud2 | PubCloud2 | 0.75 |
| 3 | Edge1 | PubCloud1 | Edge1 | PubCloud2 | PubCloud2 | 0.76 |
| 4 | Edge1 | PubCloud1 | PubCloud1 | PubCloud1 | PubCloud2 | 0.78 |
| 5 | Edge1 | Edge1 | Edge1 | PubCloud2 | PubCloud2 | 0.79 |
| 6 | Edge1 | PubCloud1 | PubCloud1 | PubCloud2 | PubCloud1 | 0.79 |
| 7 | Edge1 | Edge1 | PubCloud1 | PubCloud1 | PubCloud2 | 0.81 |
| 8 | Edge1 | Edge1 | PubCloud1 | PubCloud2 | PubCloud1 | 0.82 |
| ... | ... | ... | ... | ... | ... | ... |

FIG. 31

PROCESSING LOCATION COMBINATION TABLE

80

| # | dataA + Proc1 | dataB + Proc2 | dataC + Proc3 | dataD + Proc4 | dataE + Proc5 | ESTIMATED POWER CONSUMPTION [kW] | EXECUTION POSSIBILITY |
|---|---|---|---|---|---|---|---|
| 1 | Edge1 | PubCloud1 | PubCloud1 | PubCloud2 | PubCloud2 | 0.72 | X |
| 2 | Edge1 | Edge1 | PubCloud1 | PubCloud2 | PubCloud2 | 0.75 | X |
| 3 | Edge1 | PubCloud1 | Edge1 | PubCloud2 | PubCloud2 | 0.76 | X |
| 4 | Edge1 | PubCloud1 | PubCloud1 | PubCloud1 | PubCloud2 | 0.78 | X |
| 5 | Edge1 | Edge1 | Edge1 | PubCloud2 | PubCloud2 | 0.79 | O |
| 6 | Edge1 | PubCloud1 | PubCloud1 | PubCloud2 | PubCloud1 | 0.79 | X |
| 7 | Edge1 | Edge1 | PubCloud1 | PubCloud1 | PubCloud2 | 0.81 | X |
| 8 | Edge1 | Edge1 | PubCloud1 | PubCloud2 | PubCloud1 | 0.82 | X |
| ... | ... | ... | ... | ... | ... | ... | |

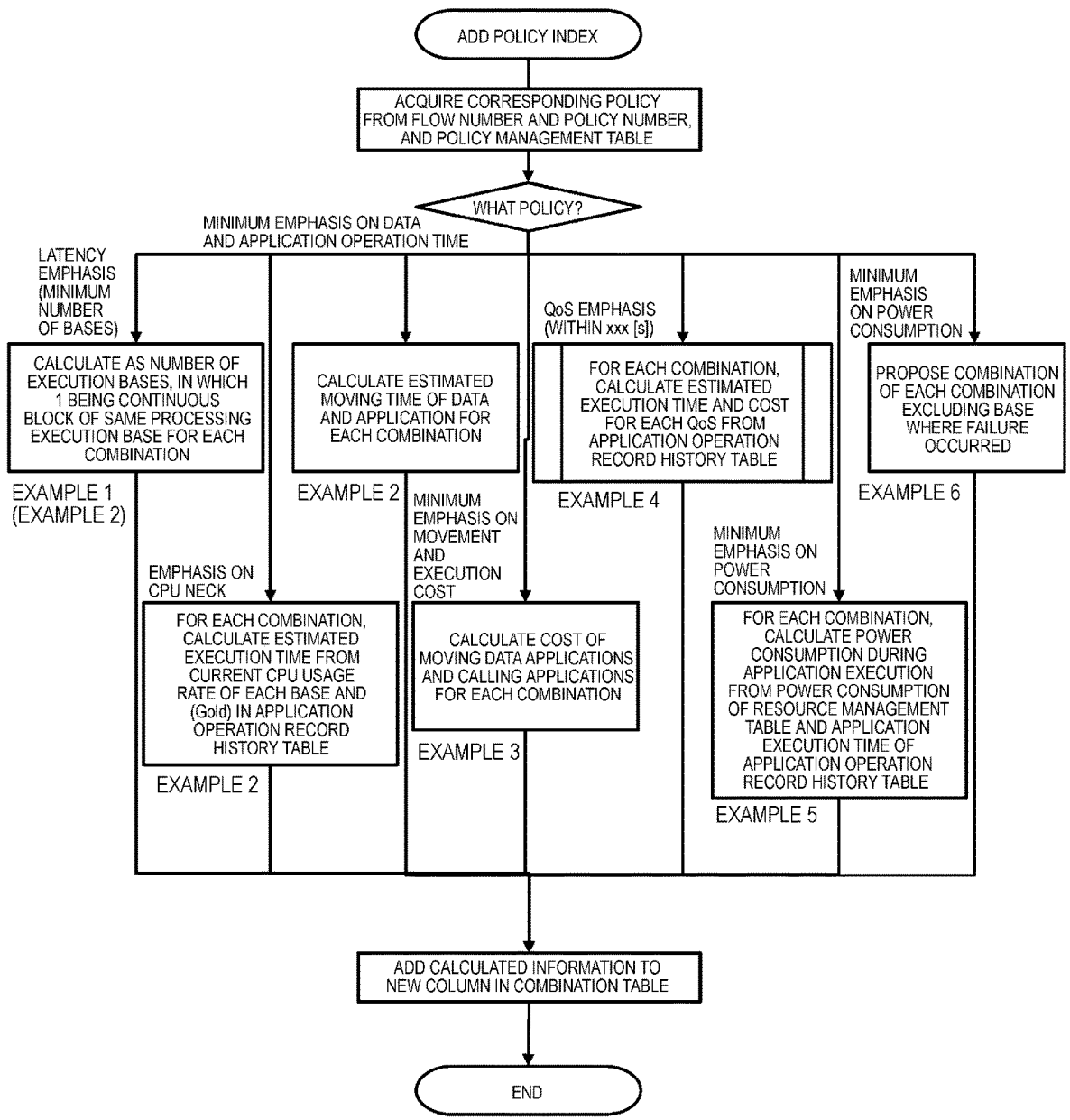

INFORMATION PROCESSING SYSTEM AND APPLICATION SERVICES DISTRIBUTION METHOD IN INFORMATION PROCESSING SYSTEM

CROSS REFERENCE TO RELATED APPLICATIONS

This application is a continuation of U.S. patent application Ser. No. 17/474,720 filed on Sep. 14, 2021, which claims the benefit of Japanese Patent Application No. 2020-214706, filed Dec. 24, 2020, the entire contents of which are incorporated herein by reference.

BACKGROUND OF THE INVENTION

1. Field of the Invention

The present invention relates to an information processing system and a data arrangement method in the information processing system.

2. Description of Related Art

In a multi-cloud environment, the data stored in the clouds installed in distributed bases is analyzed in cooperation with the on-premises cloud, public cloud, and edge cloud as needed. The analysis processing is performed by converting the finely decomposed process of the application into microservices and creating a workflow that combines the microservices to realize the ease of development. Here, each microservice (processing) is executed in the cloud of each distributed base via Web API, and communication via WAN occurs in units of microservices. Therefore, there is a problem that it takes time for execution.

Data analysis processing improves the accuracy while frequently running the trial and error cycle, and thus, if the number of communications in microservice units increases, the execution speed of the trial and error cycle will slow down accordingly.

JP-A-2015-505404 describes that an application, which performs real-time processing between a cloud and an edge device, provides services such as notifications and recommendations based on real-time feeds collected from the edge device and the cloud in a system in which a plurality of edge devices such as a personal computer, a cell phone, a smartphone, a personal digital assistant, and the like are connected to be able to communicate with the cloud via a network.

In the technology disclosed in JP-A-2015-505404, when data is scattered in distributed bases, communication by WAN between the bases occurs frequently and the cycle execution speed becomes slow.

SUMMARY OF THE INVENTION

The present invention has been made in view of the above circumstances, and an object of the present invention is to provide an information processing system and a data arrangement method in the information processing system, capable of reducing the number of communications between information processing devices installed in distributed bases and improving the execution speed of an application.

In order to solve the above problems, an information processing system according to one aspect of the present invention includes a management device capable of communicating with a plurality of information processing devices provided at each of a plurality of bases and connected to each other via a communication network, in which the information processing device includes a first processor that executes microservices obtained by dividing the functions of an application, and a storage device that stores data used by the microservices, and the management device includes a second processor, information on the microservice and data possessed by each information processing device, and performance information describing the performance of each information processing device, and the second processor uses predetermined data to cause the information processing device to execute a plurality of predetermined microservices in a predetermined order to execute the application, and when executing the application, the microservices and the data are moved between information processing devices based on the information on the microservice and the data possessed by each information processing device, and the performance information.

According to the present invention, it is possible to reduce the number of communications between information processing devices installed on distributed bases and improve the execution speed of an application.

BRIEF DESCRIPTION OF THE DRAWINGS

FIG. 2 is a diagram showing an example of the configuration of a wide-area distributed metadata management table stored in Edge1 of the information processing system according to the embodiment;

FIG. 3 is a diagram showing an example of the configuration of a wide-area distributed metadata management table stored in On-Prem1 of the information processing system according to the embodiment;

FIG. 4 is a diagram showing an example of the configuration of a wide-area distributed metadata management table stored in PubCloud1 of the information processing system according to the embodiment;

FIG. 5 is a diagram showing an example of the configuration of a wide-area distributed metadata management table created by Application Platform of the information processing system according to the embodiment;

FIG. 6 is a diagram showing an example of the configuration of a user-defined processing flow of the information processing system according to the embodiment;

FIG. 7 is a diagram showing an example of the configuration of an application ID-application name conversion table of the information processing system according to the embodiment;

FIG. 8 is a diagram showing an example of the configuration of a data ID-data name conversion table of the information processing system according to the embodiment;

FIG. 9 is a diagram showing an example of the configuration of an application and data management table of the information processing system according to the embodiment;

FIG. 10 is a diagram showing an example of the configuration of an application operation record history table of the information processing system according to the embodiment;

FIG. 11 is a diagram showing an example of the configuration of a resource and performance management table of the information processing system according to the embodiment;

FIG. 12 is a diagram showing an example of the configuration of a bandwidth table of the information processing system according to the embodiment;

FIG. 13 is a diagram showing an example of the configuration of a latency table of the information processing system according to the embodiment;

FIG. 14 is a diagram showing an example of the configuration of a policy management table of the information processing system according to the embodiment;

FIG. 15 is a flowchart showing an example of the operation of the information processing system according to the embodiment;

FIG. 21 is a diagram showing an example of the configuration of a processing location combination table of the information processing system according to Example 1;

FIG. 22 is a diagram showing another example of the configuration of the processing location combination table of the information processing system according to Example 1;

FIG. 23 is a diagram showing an example of the configuration of an application data management table of the information processing system according to Example 2;

FIG. 24 is a diagram showing an example of the configuration of a processing location combination table of the information processing system according to Example 2;

FIG. 25 is a diagram showing an example of the configuration of an application data management table of the information processing system according to Example 3;

FIG. 26 is a diagram showing an example of the configuration of a processing location combination table of the information processing system according to Example 3;

FIG. 27 is a diagram showing an example of the configuration of a processing location combination table of the information processing system according to Example 4;

FIG. 30 is a diagram showing an example of the configuration of a processing location combination table of the information processing system according to Example 5;

FIG. 31 is a diagram showing an example of the configuration of a processing location combination table of the information processing system according to Example 6; and FIG. 32 is a flowchart showing an example of a policy in the information processing system and a method of generating a processing location combination table based on the policy according to the embodiment.

DESCRIPTION OF EMBODIMENTS

Figure 1:
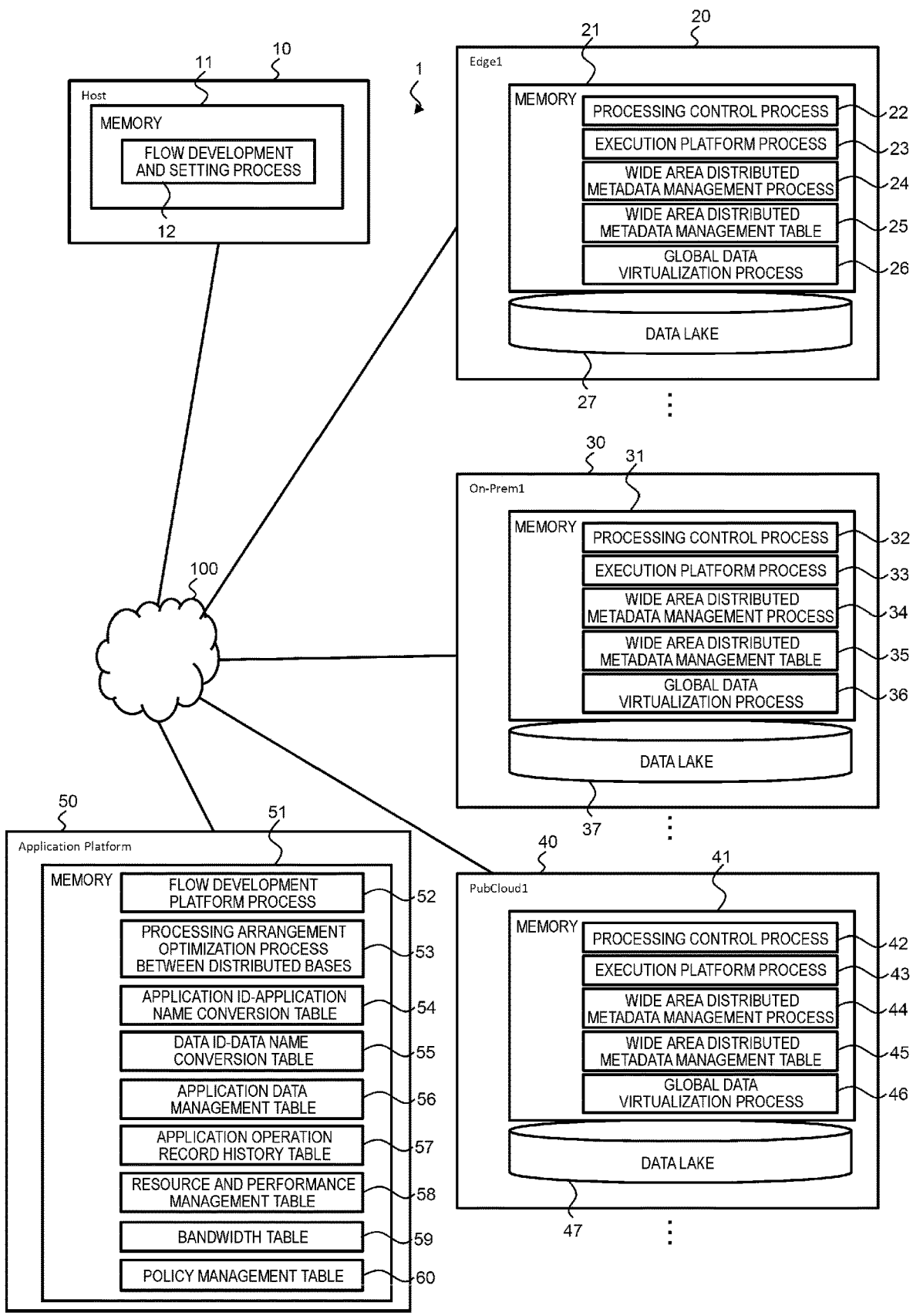
FIG. 1 is a diagram showing a schematic configuration of an information processing system according to an embodiment.

Hereinafter, embodiments of the present invention will be described with reference to the drawings. The embodiments described below do not limit the invention according to the claims, and all of the elements and combinations thereof described in the embodiments are not always essential for the solving means of the invention.

In the following description, the "memory" is one or more memories and may typically be the main storage device. At least one memory in the memory unit may be a volatile memory or a non-volatile memory.

In the following description, the "processor" is one or more processors. At least one processor is typically a microprocessor such as a central processing unit (CPU) but may be another type of processor such as a graphics processing unit (GPU). At least one processor may be single-core or multi-core.

At least one processor may be a processor in a broad sense such as a hardware circuit (for example, field-programmable gate array (FPGA) or application specific integrated circuit (ASIC)) that performs a part or all of the processing.

In the present disclosure, the storage device includes one storage drive such as one hard disk drive (HDD) or solid state drive (SSD), a RAID device including a plurality of storage drives, and a plurality of RAID devices. When the drive is an HDD, for example, a serial attached SCSI (SAS) HDD may be included, or an NL-SAS (nearline SAS) HDD may be included.

In the following description, information that can obtain an output for an input may be described by an expression such as "xxx table", but the information may be data of any structure or a learning model such as a neural network generating an output for an input. Therefore, the "xxx table" can be referred to as "xxx information".

In the following description, the configuration of each table is an example and one table may be divided into two or more tables, or all or part of the two or more tables may become one table.

In the following description, a process may be described with "program" as the subject but the program is executed by the processor to perform the specified process by appropriately using a storage resource (for example, memory) and/or a communication interface device (for example, a port). Therefore, the subject of the process may be a program. The process described with the program as the subject may be a process performed by a processor or a computer having the processor.

The program may be installed on a device such as a computer or may be on, for example, a program distribution server or a computer-readable (for example, non-temporary) recording medium. In the following description, two or more programs may be realized as one program, or one program may be realized as two or more programs.

In the following description, when the description is made without distinguishing the same type of elements, a reference sign (or a common sign among the reference signs) is used, and when the description is made by distinguishing the same type of elements, an identification number (or reference sign) of the element may be used.

The terms used in the present specification are defined below.

Data and app (abbreviation of application: used below as appropriate) moving time: Time when data or application is moved to a specified base (hereinafter, also referred to as "moving time")

App execution time: Execution time when the application is executed at the base

Processing time: For each process, the total time of data and application moving time, and application execution time Next, the configuration and operation of the information processing system of the embodiment common to Examples 1 to 6 will be described with reference to FIGS. 1 to 20.

FIG. 1 is a diagram showing a schematic configuration of an information processing system according to an embodiment.

The information processing system 1 of the embodiment includes Host 10, Edge1 20, On-Prem1 30, PubCloud1 40, and Application Platform 50. The Host 10, Edge1 20, On-Prem1 30, PubCloud1 40, and Application Platform 50 are connected to each other to be able to communicate with each other by a network 100 composed of a wide area network (WAN) and the like.

Host 10 is accessed by the user of the information processing system 1 of the present embodiment and is composed of an information processing device such as a personal computer (PC) or a server as an example. The information processing device generally includes a processor (arithmetic element), a memory (storage medium), and a communication interface, and further includes an input device such as a mouse and a keyboard, and a display device such as a display, if necessary.

In the following description, when the operating subject is described as "OO unit is", it means that the function of the OO unit is realized after the processor reads the processing contents of the OO unit, which is a program, from the memory (the details will be described later).

A flow development and setting processing unit 12 is stored in a memory 11 of Host 10. When the user of Host 10 executes an application, the flow development and setting processing unit 12 creates a specified workflow that defines the execution order of the microservice obtained by dividing the functions of the application and the data used by the microservice based on the instruction from the user and executes the application based on the workflow. Here, the flow development and setting processing unit 12 selects one of the processing location proposals presented by Application Platform 50 based on the instruction input from the user.

Edge1 20 is an edge cloud installed near the base where Host 10 is installed. On-Prem1 30 is an on-premises cloud installed at a base such as the premises of the company to which the user who operates Host 10 belongs. PubCloud1 40 is a so-called public cloud. In FIG. 1, Edge1 20, On-Prem1 30, and PubCloud1 40 are shown only one each, but a plurality of edge clouds and the like may be provided.

Edge1 20, On-Prem1 30, and PubCloud1 40 all have at least one server. The memory 21, 31, and 41 of Edge1 20, On-Prem1 30, and PubCloud1 40 store processing control processing units 22, 32, and 42, execution platform processes 23, 33, and 43, and wide-area distributed metadata management processing units 24, 34, and 44, and global data virtualization processing units 26, 36, and 46, respectively.

The processing control process units 22, 32, and 42 are arranged in the respective Edge1 20 and the like, and monitor the processing of the deployed (executed) microservice. Execution platform processes 23, 33, and 43 provide a platform for managing the containers that constitute a microservice. Wide-area distributed metadata management processing units 24, 34, and 44 are arranged in Edge1 20, and the like, and manage data executed by microservices. The global data virtualization processing units 26, 36, and 46 execute the data virtualization process in Edge1 20, On-Prem1 30, and PubCloud1 40, and when there is a request for data acquisition and the data is not stored in Edge1 20, On-Prem1 30, and PubCloud1 40, where the request has been received, the data is moved from other Edge1 20, On-Prem1 30 and PubCloud1 40.

The wide-area distributed metadata management tables 25, 35, and 45 are stored in the memories 21, 31, and 41 of Edge1 20, On-Prem1 30, and PubCloud1 40. The details of the wide-area distributed metadata management tables 25, 35, and 45 will be described later.

Edge1 20, On-Prem1 30, and PubCloud1 40 include data lakes 27, 37, and 47, which are storage devices for storing data.

Application Platform 50 is a platform server that manages microservices and applications that are executed in Edge1 20, On-Prem1 30, and PubCloud1 40. Application Platform 50 may be installed at any of Edge1, 20, On-Prem1, 30, and PubCloud1 40.

A memory 51 of Application Platform 50 stores a flow development platform processing unit 52 and a distributed base-to-base processing arrangement optimization processing unit 53. The flow development platform processing unit 52 manages the environment in which the user creates a workflow at Host 10. The distributed base-to-base processing arrangement optimization processing unit 53 moves microservices and data between Edge1 20, On-Prem1 30, and PubCloud1 40 as appropriate in order to perform the optimum arrangement of microservices and data distributed in Edge1 20, On-Prem1 30, and PubCloud1 40 based on the workflow created by the user. Here, the distributed base-to-base processing arrangement optimization processing unit 53 performs the optimum arrangement of microservices and data according to a plurality of predetermined policies. The details of the operation of the distributed base-to-base processing arrangement optimization processing unit 53 will be described later.

In the memory 51 of Application Platform 50, an application ID-app name conversion table 54, a data ID-data name conversion table 55, an application data management table 56, and an application operation record history table 57, a resource and performance management table 58, a bandwidth table 59, a latency table (not shown in FIG. 1), and a policy management table 60 are stored. Details of the various tables will be described later.

FIG. 2 is a diagram showing an example of the configuration of the wide-area distributed metadata management table 25 stored in Edge1 20 of the information processing system according to the embodiment.

The wide-area distributed metadata management table 25 is a list of microservices and data stored in the data lake 27 of Edge1 20. The wide-area distributed metadata management table 25 includes, as entries, a data name 25a, a data holding location 25b, a data size 25c, a data outline 25d, a snapshot date 25e, replica information 25f, a domestic movement possibility 25g, and an overseas movement possibility 25h.

The data name 25a stores the names of the microservices and data stored in the data lake 27 of Edge1 20. The data holding location 25b stores a link of a location where the microservice or the like described in the data name 25a is stored. The data size 25c stores the size of the microservice or the like described in the data name 25a. In the data summary 25d, a summary of the microservice or the like described in the data name 25a is stored. The snapshot date 25e stores the date on which the snapshot was created if the microservice or the like (limited to the data in this case) described in the data name 25a is a snapshot. If the microservice or the like described in the data name 25a is a replica of the microservice or the like of another base, the replica information 25f stores the base where the original microservice or the like is stored. The domestic movement possibility 25g stores information on whether the microservice or the like described in the data name 25a can be moved to another base in the country. Information on whether the microservice or the like described in the data name 25a can be moved to another base outside the country is stored in the overseas movement possibility 25h. The information described in the domestic movement possibility 25g and the overseas movement possibility 25h is predetermined for each microservice or the like.

As shown in FIG. 2, in the information processing system 1 of the present embodiment, Edge1 20 (the same applies to On-Prem1 30 and PubCloud1 40) creates a snapshot of the data stored in the data lake 27 at appropriate timing and is stored in the data lake 27. Edge1 20 stores replicas of microservices and the like stored in data lakes 37 and 47 of other bases in data lake 27. In the information processing system 1 of the present embodiment, the microservice includes a container and a source code. Hereinafter, microservices may be referred to as "processing".

FIG. 3 is a diagram showing an example of the configuration of the wide-area distributed metadata management table 35 stored in On-Prem1 30 of the information processing system 1 according to the embodiment, and FIG. 4 is a diagram showing an example of the configuration of the wide-area distributed metadata management table 45 stored in PubCloud1 40 of the information processing system 1 according to the embodiment, which is stored in PubCloud1 40.

The wide-area distributed metadata management tables 35 and 45 all have the same configuration as the wide-area distributed metadata management table 25 stored in Edge1 20. That is, the wide-area distributed metadata management tables 35 and 45 include, as entries, data names 35a and 45a, data holding locations 35b and 45b, data sizes 35c and 45c, data summaries 35d and 45d, snapshot dates 35e and 45e, replica information 35f and 45f, domestic movement possibilities 35g and 45g, and overseas movement possibilities 35h and 45h.

FIG. 5 is a diagram showing an example of the configuration of a wide-area distributed metadata management table 61 created by Application Platform. 50 of the information processing system 1 according to the embodiment. The wide-area distributed metadata management table 61 is temporarily created based on the inquiry result of Application Platform 50 inquiring the contents of the wide-area distributed metadata management table 25 to each base (Edge1 20 and the like) as needed.

The wide-area distributed metadata management table 61 has the same configuration as the wide-area distributed metadata management tables 25, 35, and 45 except that the base name 61a is added. That is, the wide-area distributed metadata management table 61 includes, as entries, a base name 61a, a data name 61b, a data holding location 61c, a data size 61d, a data summary 61e, a snapshot date 61f, a replica information 61g, a domestic movement possibility 61h, and an overseas movement possibility 61i. The content of the entry is a compilation of the wide-area distributed metadata management tables 25, 35, and 45 of each base. The base name 61a stores the name of the base in which the microservices and the like described in the data name 61b are stored.

FIG. 6 is a diagram showing an example of the configuration of a user-defined processing flow 70 of the information processing system 1 according to the embodiment.

The user-defined processing flow 70 shown in FIG. 6 defines the specific contents of the workflow created by the flow development and setting processing unit 12 of the Host and is created for each workflow. The user-defined processing flow 70 includes an application ID 70a, an input data transfer source application ID 70b, an output data transfer destination application ID 70c, and a usage data ID 70d as entries.

Each line of the user-defined processing flow 70 represents a step executed by the workflow and is executed in order from the step shown in the top line. The application ID 70a stores an ID for identifying the microservice to be executed in the step. The input data transfer source application ID 70b stores the transfer source application ID that transfers the input data required by the microservice executed in the step to the microservice. The output data transfer destination application ID 70c stores the transfer destination application ID to which the output data output by the microservice executed in the step should be transferred. The usage data ID 70d stores the ID of the data used by the microservice executed in the step.

FIG. 7 is a diagram showing an example of the configuration of an application ID-application name conversion table 54 of the information processing system 1 according to the embodiment.

The application ID-application name conversion table 54 includes an application ID 54a and an application name 54b as entries. Each row of the application ID-application name conversion table 54 corresponds to each of the microservices. The ID of the microservice is stored in the application ID 54a. The application ID 54a corresponds to the application ID 70a of the user-defined processing flow 70. The name of the microservice is stored in the application name 54b. The application name 54b corresponds to the name of the microservice described in the data names 25a, 35a, 45a, and 61b of the wide-area distributed metadata management tables 25, 35, 45, and 61.

FIG. 8 is a diagram showing an example of the configuration of a data ID-data name conversion table 55 of the information processing system 1 according to the embodiment.

The data ID-data name conversion table 55 includes a data ID 55a and a data name 55b as entries. Each row of the data ID-data name conversion table 55 corresponds to each of the data. The ID of the data is stored in the data ID 55a. The data ID 55a corresponds to the usage data ID 70d of the user-defined processing flow 70. The data name 55b stores the name of the data. The data name 55b corresponds to the data name described in the data names 25a, 35a, 45a, 61b of the wide-area distributed metadata management tables 25, 35, 45, and 61.

FIG. 9 is a diagram showing an example of the configuration of the application data management table 56 of the information processing system 1 according to the embodiment.

The application data management table 56 is a table showing microservices and data used in the workflow created by the user of Host 10 and is created for each workflow. The application data management table 56 is created by Application Platform 50 based on the user-defined processing flow 70 and the wide-area distributed metadata management table 61.

The application data management table 56 includes a flow1 56a, a URL 56b, a domestic movement possibility 56c, and an overseas movement possibility 56d as entries.

The name of the microservice or the like used in the workflow (the workflow named Flow1 in the example shown in FIG. 9) is stored in Flow1 56a. The URL 56b stores, as a URL, a link to a base where the microservices and the like described in Flow1 56a are stored. The domestic movement possibility 56c stores information on whether the microservices and the like described in Flow1 56a can be moved to other bases in the country. Information on whether the microservices and the like described in Flow1 56a can be moved to another base outside the country is stored in the overseas movement possibility 56d.

FIG. 10 is a diagram showing an example of the configuration of an application operation record history table 57 of the information processing system 1 according to the embodiment.

The application operation record history table 57 is a table in which the actual values when the microservice is operated at each base are stored. Each row of the application operation record history table 57 has a different combination of microservices, data, execution bases, and QoS settings.

The application operation record history table 57 includes, as entries, an application name 57a, a data name 57b, an execution base 57c, a QoS setting 57d, an average execution time 57e, an average QoS cost 57f, the number of executions 57g, the last execution date and time 57h, an average read amount 57i, an average write amount 57j, and an access pattern tendency 57k.

The name of the microservice is stored in the application name 57a. The data name 57b stores the name of the data used by the microservice described in the application name 57a. The execution base 57c describes a base on which the microservice described in the application name 57a is executed. The QoS setting 57d describes the level of QoS set for the microservice described in the application name 57a. In the embodiment, Gold, Silver, Bronze, and Best-Effort are set in descending order of QoS level. In the execution average time 57e, the average time during which the microservice described in the application name 57a is executed is described. In the average QoS cost 57f, the average value of the QoS cost required when executing the microservice described in the application name 57a is described. In the number of executions 57g, the number of times that the microservice described in the application name 57a is executed is described. In the last execution date and time 57h, the date and time when the microservice described in the application name 57a was last executed are described. In the average read amount 57i, the average amount of data read by the microservice described in the application name 57a is described. In the average write amount 57j, the average amount of data written by the microservice described in the application name 57a is described. In the access pattern tendency 57k, the tendency of the access pattern of the microservice described in the application name 57a is described. In the present embodiment, the access pattern tendency is either Random or Sequential.

FIG. 11 is a diagram showing an example of the configuration of a resource and performance management table 58 of the information processing system 1 according to the embodiment. The resource and performance management table 58 is a table in which the resources and performance at each base are listed.

The resource and performance management table 58 includes, as entries, a base name 58a, a CPU 58b, the number of cores 58c, a memory 58d, a CPU utilization rate 58e, a memory usage rate 58f, power consumption 58g, SLA 58h, a location 58i, a resource cost 58j, an API charge 58k, a data transfer cost (in) 58m, and a data transfer cost (out) 58n.

The name of the base is stored in the base name 58a. The CPU 58b stores the clock frequency of the CPU of the server and cloud of the base described in the base name 58a. The number of cores 58c stores the number of CPU cores of the server and cloud of the base described in the base name 58a. The memory 58d stores the memory capacity of the server and cloud of the base described in the base name 58a. The CPU utilization rate 58e describes the CPU utilization rate of the server and cloud of the site described in the site name 58a. The memory usage rate 58f stores the memory usage rate of the server and cloud of the base described in the base name 58a. The power consumption 58g stores the power consumption of the server and cloud of the base described in the base name 58a. The SLA 58h stores the service level agreement (SLA) value of the server and cloud of the base described in the base name 58a. In the place 58i, the server and cloud installation place (installation country) of the base described in the base name 58a is stored. The resource cost 58j stores the resource cost for each level of the server and cloud QoS of the base described in the base name 58a. The API charge 58k stores a charge for executing an API (particularly Web API) on the server and cloud of the base described in the base name 58a. The data transfer cost (in) 58m stores the cost required for transferring data from the server and cloud of the base described in the base name 58a. The data transfer cost (out) 58n stores the cost required for transferring data to the server and cloud of the base described in the base name 58a.

FIG. 12 is a diagram showing an example of the configuration of a bandwidth table 59 of the information processing system 1 according to the embodiment.

In the bandwidth table 59, the bandwidth of the network between the bases listed at the right end of each row and the bases listed at the top of each column is listed in each cell.

FIG. 13 is a diagram showing an example of the configuration of a latency table 62 of the information processing system 1 according to the embodiment.

In the latency table 62, the latency of the network between the bases listed at the right end of each row and the bases listed at the top of each column is listed in each cell.

FIG. 14 is a diagram showing an example of the configuration of a policy management table 60 of the information processing system 1 according to the embodiment.

In the policy management table 60, predetermined policies (policy0 60b to policy2 60d) are described for each workflow described in the flow name 60a. At least one policy is predetermined for each workflow, but a plurality of policies may be predetermined for one workflow. In the embodiment, policy0 60b is the highest priority policy, and the priority decreases as the policy number increases.

Next, the operation of the information processing system 1 of the present embodiment will be described with reference to the flowcharts of FIGS. 15 to 19 and FIG. 20.

FIG. 15 is a flowchart showing an example of the operation of the information processing system according to the embodiment.

First, a user of Host 10 refers to the processing (microservices) and data contents of the wide-area distributed metadata management tables 25, 35, and 45 at each base (Edge1 20, On-Prem1, 30, PubCloud1 40) to create a data analysis processing flow (workflow) (1501). The workflow created by the user is stored as a user-defined processing flow 70. Application Platform 50 aggregates the wide-area distributed metadata management tables 25, 35, and 45 of each base (Edge1 20, On-Prem1 30, PubCloud1 40) to create a wide-area distributed metadata management table 61 and the user may refer to the wide-area distributed metadata management table 61.

Next, the user of Host 10 determines the policy applied to the workflow created in 1501 (1502). The determined policy is stored in the policy management table 60.

Next, the user of Host 10 instructs each base (Edge1 20, On-Prem1 30, PubCloud1 40) to execute the workflow created in 1501 (1503). Application Platform 50 executes the processing location search process by the distributed base-to-base processing arrangement optimization processing unit 53 in response to the workflow instruction from the user (1504). Details of 1504 will be described later. The processing location search process is repeated until it is determined that the condition is satisfied by the policy determined by the user in 1502 (YES in 1505).

Next, the user of Host 10 selects one processing location proposal from the processing location proposals presented to the user by the processing location search processing of 1504 (1506). Then, Application Platform 50 performs the processing execution process by the distributed base-to-base processing arrangement optimization processing unit 53 based on the processing location proposal selected in 1506 (1507).

If it is determined that the processing execution process in 1507 has failed (YES in 1508), the process returns to 1502 and the policy setting process is performed again. If it is determined that the processing execution process is successful (NO in 1508), the user of Host 10 acquires the execution result (1509).

Figure 16:
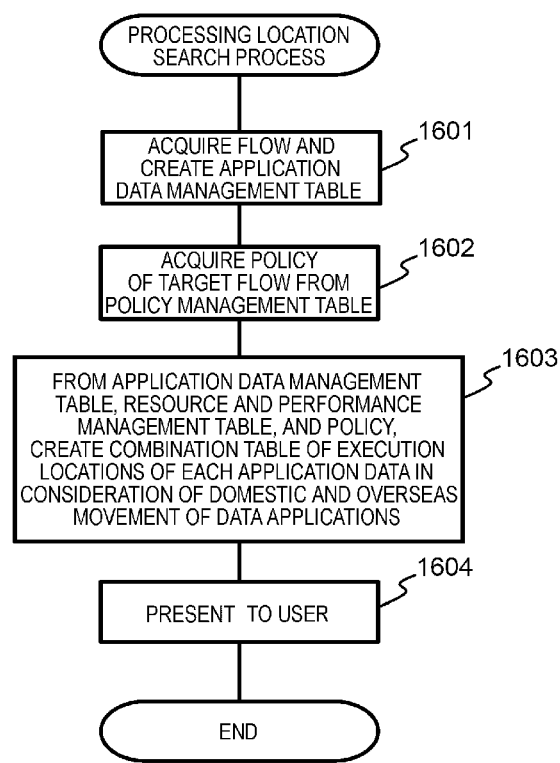
FIG. 16 is a flowchart showing an example of a processing location search process of the information processing system according to the embodiment.

FIG. 16 is a flowchart showing an example of the processing location search process of the information processing system 1 according to the embodiment. The flowchart shown in FIG. 16 corresponds to 1504 in FIG. 15.

First, the distributed base-to-base processing arrangement optimization processing unit 53 of Application Platform 50 acquires the workflow (user-defined processing flow 70) instructed by the user in 1503 and creates the application data management table 56 (1601). Next, the distributed base-to-base processing arrangement optimization processing unit 53 acquires the workflow policy instructed by the user in 1503 from the policy management table 60 (1602).

Next, the distributed base-to-base processing arrangement optimization processing unit 53 creates a combination table of each application and data execution location (processing location) considering whether the data application can be moved domestically or internationally based on the policies acquired in the application data management table 56, the resource and performance management table 58, and 1602 (1603). Specific examples of the execution location combination table will be shown in the Examples described later. Then, the distributed base-to-base processing arrangement optimization processing unit 53 presents the combination table of the execution locations created in 1603 to the user (1604).

Figure 17:
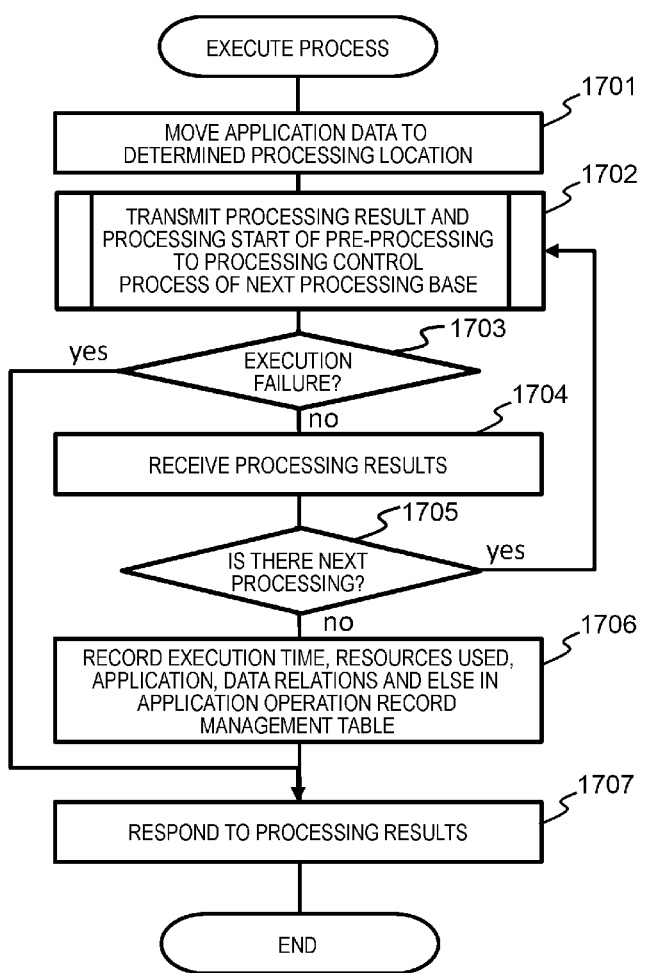
FIG. 17 is a flowchart showing an example of an execution process of the information processing system according to the embodiment.

FIG. 17 is a flowchart showing an example of execution processing of the information processing system according to the embodiment. The flowchart shown in FIG. 17 corresponds to 1507 of FIG. 15.

First, the distributed base-to-base processing arrangement optimization processing unit 53 moves the application (microservice) and data to the designated base based on the processing location proposal selected by the user in 1506 in FIG. 15 (1701). Next, the distributed base-to-base processing arrangement optimization processing unit 53 transmits the processing result of the pre-processing to the processing control process of the next processing base and also transmits the processing start instruction to the next base (1702).

Next, the distributed base-to-base processing arrangement optimization processing unit 53 determines whether the processing execution has failed in 1702 (1703). Then, if it is determined that the processing execution has failed (YES in 1703), the process proceeds to 1707, and if it is determined that the processing execution is successful (NO in 1703), the process proceeds to 1704. In 1704, the processing result is received from the base.

Next, the distributed base-to-base processing arrangement optimization processing unit 53 determines whether there is the next processing (1705), and if it is determined that there is the next processing (YES in 1705), returns to 1702 and instructs to start the next processing. If it is determined that there is no next processing (NO in 1705), the process proceeds to 1706.

In 1706, the distributed base-to-base processing arrangement optimization processing unit 53 records the execution time, the resources used, and the numerical values related to the application and data in the application operation record history table 57.

Then, the distributed base-to-base processing arrangement optimization processing unit 53 returns the processing result to the user of Host 10.

Figure 18:
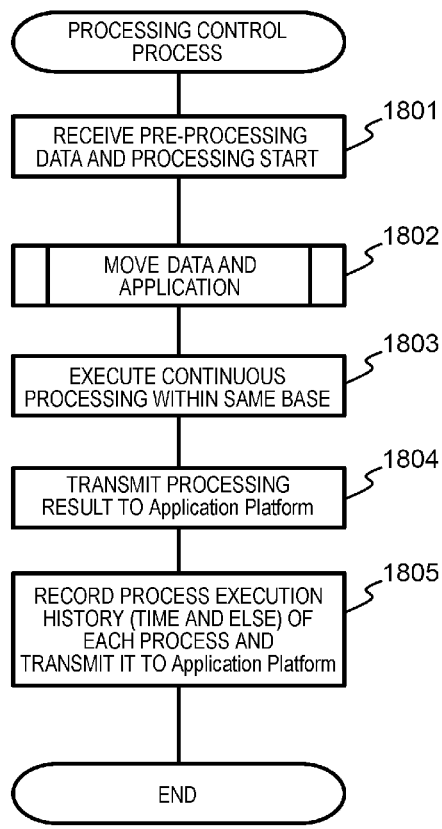
FIG. 18 is a flowchart showing an example of a processing control process of the information processing system according to the embodiment.

FIG. 18 is a flowchart showing an example of the processing control process of the information processing system 1 according to the embodiment. The processing control process shown in the flowchart of FIG. 18 is executed at each base (Edge1 20, On-Prem1 30, PubCloud1 40).

First, the processing control processing units 22, 32, and 42 of each base receive pre-processed data and processing start instructions from other bases (1801). The processing control processing units 22, 32, and 42 then move the microservices and data (1802). The details of 1802 will be described later. The processing control processing units 22, 32, and 42 execute continuous processing within themselves (same base) (1803).

Then, the processing control processing units 22, 32, and 42 transmit the processing result to Application Platform 50 (1804), record the processing execution history of each process executed at its own base, and transmit the record to Application Platform 50 (1805).

Figure 19:
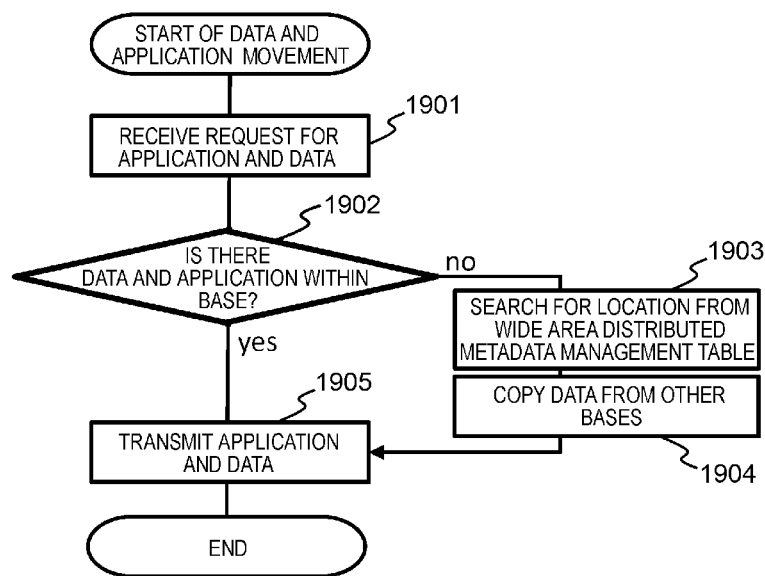
FIG. 19 is a flowchart showing an example of a data and application moving process of the information processing system according to the embodiment.

FIG. 19 is a flowchart showing an example of a data and application moving process of the information processing system 1 according to the embodiment. The flowchart shown in FIG. 19 corresponds to 1802 in FIG. 18.

First, when the global data virtualization processing units 26, 36, and 46 of each base receive the (movement) request of the application and data (1901), it is determined whether the data and application requested in the own base are stored in the data lakes 27, 37, and 47 (1902). Then, if it is determined that the requested data and application in its own base are stored in the data lakes 27, 37, and 47 (YES in 1902), the requested data and application in 1905 is transmitted. If it is determined that the requested data and application are not stored in the data lakes 27, 37, and 47 (NO in 1902), the location of the requested data and application is searched with reference to the wide-area distributed metadata management tables 25, 35, and 45 (1903). Then, the data is copied from another base where it is located (1904), and the requested data and application are transmitted.

Figure 20:
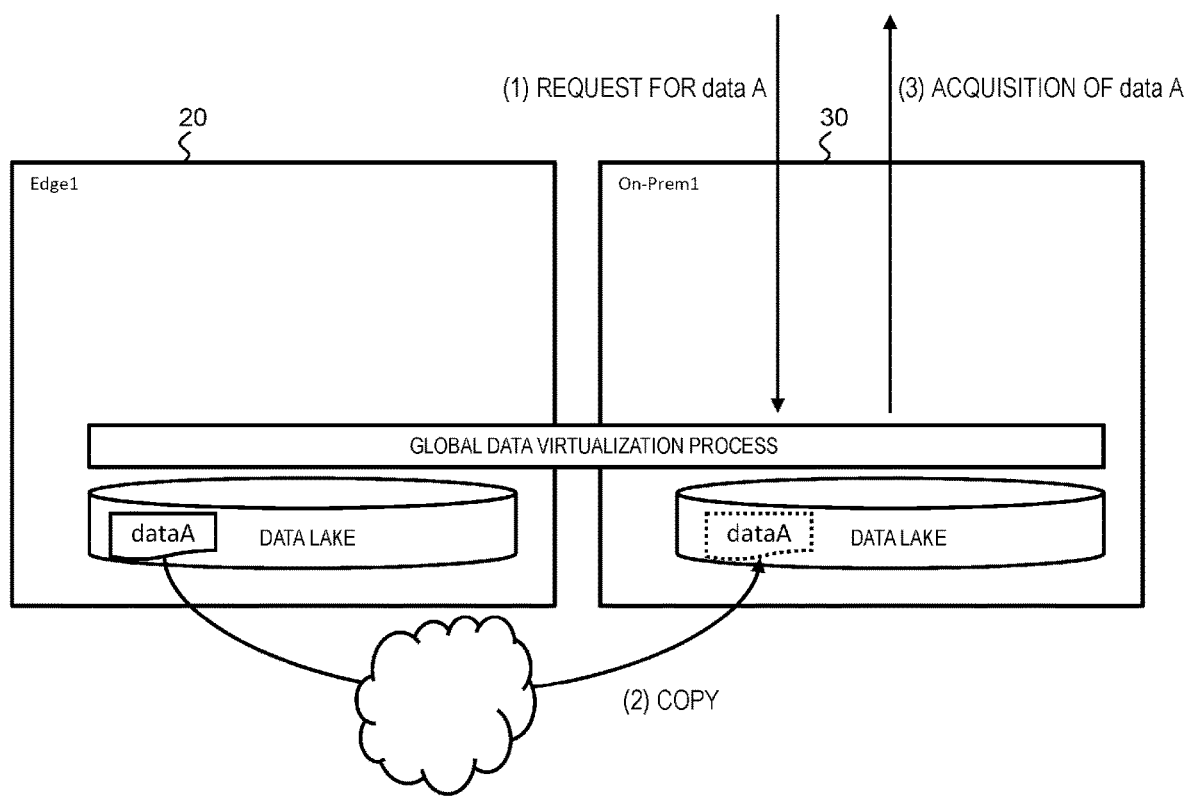
FIG. 20 is a diagram for illustrating an outline of data and application movement processing of the information processing system according to the embodiment.

FIG. 20 is a diagram for illustrating the outline of the data and application moving process of the information processing system 1 according to the embodiment and is a diagram for illustrating the processing flow of FIG. 19.

First, in the example shown in FIG. 20, On-Prem1 30 receives a request for data A (dataA) ((1) in the drawing). Since the data A is not stored in the data lake 37 of On-Prem1 30, the global data virtualization processing units 26 and 36 of the Edge1 20 in which the On-Prem1 and the data A are stored in the data lake 27 copies the data A from.

Edge1 20 to On-Prem1 30 ((2) in the drawing) to acquire and transmit the data A ((3) in the drawing).

According to the embodiment configured in this way, microservices and data can be moved and executed between each base according to the policy. Therefore, according to the present embodiment, it is possible to reduce the number of communications between distributed bases and improve the execution speed of the application.

Example 1

Hereinafter, the features of each policy shown in the policy management table 60 shown in FIG. 14 will be described for each policy (for each example). In Example 1, the operation of the information processing system 1 when the emphasis on performance (latency) (minimum number of bases) is employed as the policy will be described. The policy is employed in Flow1 of the workflow as shown in FIG. 14.

FIG. 21 is a diagram showing an example of the configuration of the processing location combination table 80 of the information processing system 1 according to Example 1. The processing location combination table 80 is created by the distributed base-to-base processing arrangement optimization processing unit 53 of Application Platform 50 in 1603 of the flowchart of FIG. 16.

The processing location combination table 80 shown in FIG. 21 is before the policy is applied. In Example 1, Flow1 is composed of data A to E (dataA-E) and microservices 1 to 5 (Proc1-5) and is executed in the combination shown in the top row of the processing location combination table 80. Considering these combinations of microservices and data, and combinations of bases (in the present example, Edge1, On-Prem1, PubCloud1, and PubCloud2 exist as bases), it is assumed that there are 144 combinations.

FIG. 22 is a diagram showing another example of the configuration of the processing location combination table 80 of the information processing system 1 according to Example 1 and is a diagram showing the processing location combination table 80 when the policy is applied.

The policy in Example 1 emphasizes the performance of the entire information processing system 1 by minimizing the latency between the bases. Therefore, the combination of the processing locations where the number of bases where microservices and the like are executed is the smallest is proposed to the user.

In the example shown in FIG. 22, the number of execution bases in the combination of processing locations of combination number (#) 1 is 1 (that is, all processing is performed by Edge1), and the distributed base-to-base processing arrangement optimization processing unit 53 proposes the combination of the processing locations of the combination number 1 to the user.

Example 2

In Example 2, the operation of the information processing system 1 when performance (focusing on CPU neck), shortest data and application moving time, and emphasis on performance (latency) (minimum number of bases) are employed as policies will be described. This policy is employed in Flow2 of the workflow as shown in FIG. 14.

FIG. 23 is a diagram showing an example of the configuration of the application data management table 56 of the information processing system 1 according to Example 2, and FIG. 24 is a diagram showing an example of the configuration of the processing location combination table 80 of the information processing system 1 according to Example 2. In Example 2, as shown in FIG. 23, Flow2 is composed of data A to F (dataA-F) and microservices 1 to 6 (Proc1-6) and is assumed to be executed in the combination shown in the top row of the processing location combination table 80 shown in FIG. 24.

The policy in Example 2 emphasizes the performance of the entire information processing system 1 by reducing the execution time based on the application execution time and the data and application moving time. The latency between bases may be further considered.

Here, the estimated application execution time is calculated from the CPU utilization rate 58$e$ in the resource and performance management table 58 and the execution average time 57$e$ of the entry in which the QoS setting 57$d$ in the application operation record history table 57 is Gold. As an example, the following is obtained:

Estimated execution time of Prod on Edge1 20=Average execution time of Prod on Edge1 (Gold)/(1−CPU utilization rate 58$e$ of Edge1 20).

For the data and application moving time, the estimated moving time between bases is calculated from the data size 25$c$ of the corresponding microservices and the like in the wide-area distributed metadata management table 25, 35, 45, and 61, and the bandwidth table 59. As an example, the following is obtained:

Time for moving data$C$+Proc3 in On-Prem1 30 to Edge1 20=(data$C$ size+Proc3 size)/(bandwidth MB/s between On-Prem1 30 and Edge1 20).

In the example shown in FIG. 24, the combination with the combination number (#) of 6 is considered to be optimal when only the estimated application execution time is considered, but the estimated moving time of the combination numbers 4 and 6 is compared with other combinations. Since it is long, combination numbers 4 and 6 are not finally determined to be optimal. Therefore, the distributed base-to-base processing arrangement optimization processing unit 53 finally determines that the combination number (#) 1 is optimal considering the estimated moving time and the number of execution bases, and proposes the combination of the processing location of the combination number 1 to the user.

Example 3

In Example 3, the operation of the information processing system 1 when the cost minimum emphasis is employed as the policy will be described. This policy is adopted in Flow3 of the workflow as shown in FIG. 14.

FIG. 25 is a diagram showing an example of the configuration of the application data management table 56 of the information processing system 1 according to Example 3, and FIG. 26 is a diagram showing an example of the configuration of a processing location combination table 80 of the information processing system 1 according to Example 2. In Example 2, as shown in FIG. 25, Flow3 is composed of data A to E (dataA-E) and microservices 1 to 5 (Proc1-5) and shall be executed in the combination shown in the top row of the processing location combination table 80 shown in FIG. 25.

The policy in Example 3 minimizes the cost required when executing the microservice or the like at each base, and therefore, a combination that minimizes the sum of various types of costs required when executing the microservice or the like at each base (in the present embodiment, the total estimated cost, which is the total of the process data movement cost, infrastructure usage fee, and process execution API charge) is proposed to the user.

In the example shown in FIG. 26, the estimated total cost in the combination of the processing locations of the combination numbers (#) 3 and 7 is the minimum, and the distributed base-to-base processing arrangement optimization processing unit 53 proposes a combination of the processing locations of the combination numbers 3 and 7 to the user.

Example 4

In Example 4, the operation of the information processing system 1 when the emphasis on QoS is employed as the policy will be described. This policy is adopted in Flow4 of the workflow, as shown in FIG. 14.

FIG. 27 is a diagram showing an example of the configuration of the processing location combination table 80 of the information processing system 1 according to Example 4.

The policy in Example 4 is to keep the estimated number of application execution hours when executing microservices and the like at each base within a predetermined time (within seconds in the present example). Therefore, the distributed base-to-base processing arrangement optimization processing unit 53 calculates the estimated application execution time and the estimated QoS cost and proposes to the user a combination of processing locations in which the estimated application execution time falls within the predetermined time.

Figure 28:
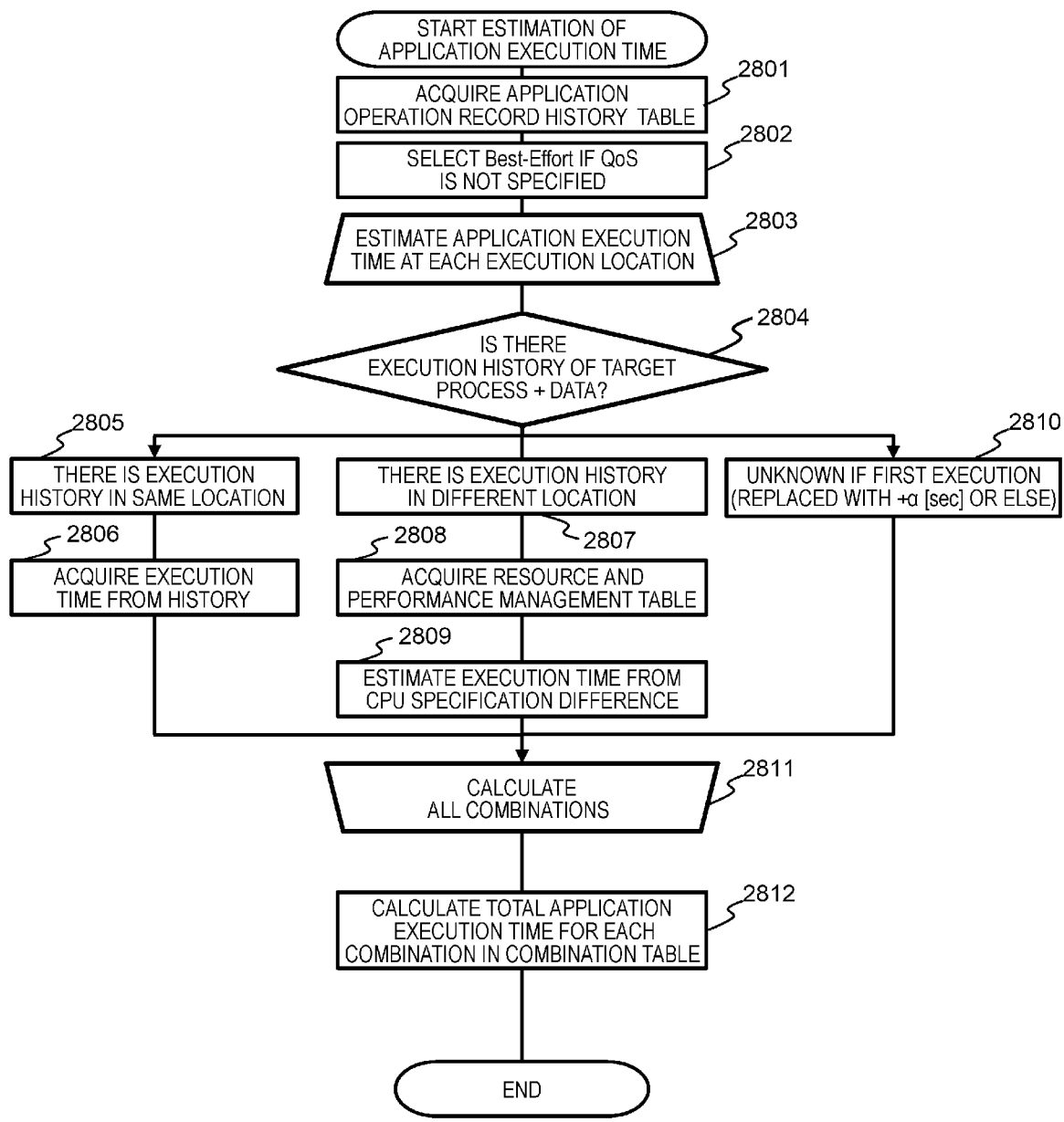
FIG. 28 is a flowchart showing an example of an application execution time calculation process of the information processing system according to Example 4.

FIG. 28 is a flowchart showing an example of the application execution time calculation process of the information processing system 1 according to Example 4.

First, the distributed base-to-base processing arrangement optimization processing unit 53 acquires the application operation record history table 57 (2801). Next, if there is no QoS setting in the QoS setting 57d of the application operation record history table 57 acquired in 2801, it is assumed that the QoS is Best-Effort in the following processing (2802).

Next, the distributed base-to-base processing arrangement optimization processing unit 53 estimates the application execution time at each execution location (each base) in the loop of 2803 to 2811.

First, the distributed base-to-base processing arrangement optimization processing unit 53 determines whether the execution history is stored in the combination of the microservice and the data in the application operation record history table 57 acquired in 2801 (2804). Then, if it is determined that there is a history of execution of the combination of the microservice and the data at the target base (2805), the distributed base-to-base processing arrangement optimization processing unit 53 acquires the execution time from this history (2806). If it is determined that there is a history of execution of the combination of the microservice and the data other than the target base (2807), the distributed base-to-base processing arrangement optimization processing unit 53 acquires the resource and performance management table 58 (2808), the execution time is estimated from the difference in specifications between the CPU used at the target base and the CPU used at the base having a history (2809). If it is determined that the combination of microservices and data is executed for the first time, the execution time is unknown (2810).

Then, after calculating all the combinations (2811), the total application execution time for each combination in the processing location combination table 80 is calculated (2812).

Figure 29:
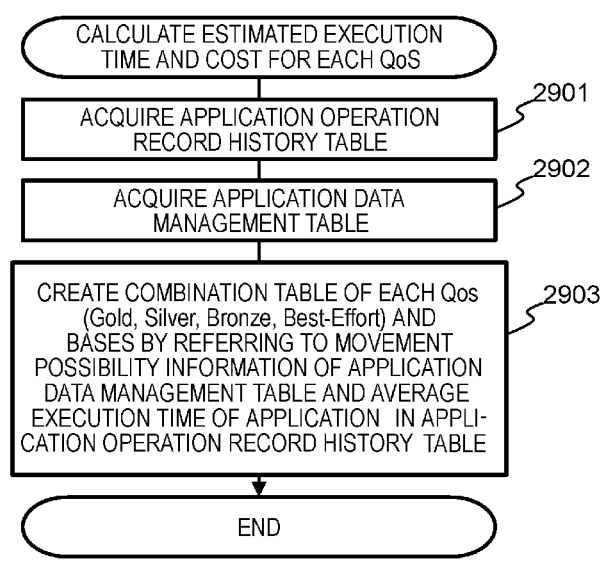
FIG. 29 is a flowchart showing an example of an estimated QoS cost calculation process of the information processing system according to Example 4.

FIG. 29 is a flowchart showing an example of the estimated QoS cost calculation process of the information processing system 1 according to Example 4.

First, the distributed base-to-base processing arrangement optimization processing unit 53 acquires the application operation record history table 57 (2901) and then acquires the application data management table 56 (2902).

Then, the distributed base-to-base processing arrangement optimization processing unit 53 creates a combination table of each QoS and the base with reference to the movability information 56c and 56d of the application data management table 56, and the execution average time 57e of the application operation record history table 57 (2903).

In the example shown in FIG. 27, the estimated application execution time in the combination of the processing locations of the combination numbers (#) 1, 2, n1, and n2 is within 60 seconds, and the distributed base-to-base processing arrangement optimization processing unit 53 proposes to the user a combination of the processing locations of the combination numbers 3 and 7.

Example 5

In Example 5, the operation of the information processing system 1 when the emphasis on energy saving is employed as the policy will be described. This policy is adopted in Flow5 of the workflow, as shown in FIG. 14.

FIG. 30 is a diagram showing an example of the configuration of a processing location combination table 80 of the information processing system 1 according to Example 5.

The policy in Example 5 emphasizes that the microservices and the like can be executed with the greatest energy saving. Therefore, the combination of the processing locations having the lowest estimated power consumption when the microservices and the like are executed is proposed to the user.

In the example shown in FIG. 30, the estimated power consumption in the combination of the processing locations of the combination number (#) 1 is the smallest, and the distributed base-to-base processing arrangement optimization processing unit 53 proposes the combination of the processing locations of the combination number 1 to the user.

Example 6

In Example 6, the operation of the information processing system 1 that adopts the emphasis on energy saving as a policy and relocates the microservices and the like when the execution of the microservices and the like fails at any of the bases will be described. This policy is adopted in Flow5 of the workflow, as shown in FIG. 14.

FIG. 31 is a diagram showing an example of the configuration of the processing location combination table 80 of the information processing system 1 according to Example 6.

Similar to Example 5, the policy in Example 6 emphasizes the most energy-saving execution when the microservices and the like are executed. Therefore, a combination of processing locations having the smallest estimated power consumption when the microservices and the like are executed is proposed to the user.

In the example shown in FIG. 31, the estimated power consumption in the combination of the processing locations of the combination number (#) 1 is the smallest, and the distributed base-to-base processing arrangement optimization processing unit 53 proposes the combination of the processing locations of the combination number 1 to the user. However, PubCloud1 40 failed and became unusable. Therefore, the distributed base-to-base processing arrangement optimization processing unit 53 proposes to the user the combination of the combination number 5 which is a combination that does not use PubCloud1 40.

FIG. 32 summarizes the procedure for selecting a policy in the above Examples 1 to 5 and creating the processing location combination table 80 based on the selected policy.

The above-described embodiments describe the configuration in detail in order to explain the present invention in an easy-to-understand manner and are not necessarily limited to the one including all the described configurations. A part of the configuration of each embodiment can be added, deleted, or replaced with another configuration.

Each of the above configurations, functions, processing units, processing means, and the like may be realized by hardware by designing a part or all of them by, for example, an integrated circuit. The present invention can also be realized by a program code of software that realizes the functions of the embodiments. Here, a storage medium in which the program code is recorded is provided to the computer, and the processor included in the computer reads out the program code stored in the storage medium. Here, the program code itself read from the storage medium realizes the functions of the above-described embodiment, and the program code itself and the storage medium storing the program code constitute the present invention. Examples of the storage medium for supplying such a program code include a flexible disk, a CD-ROM, a DVD-ROM, a hard disk, a solid state drive (SSD), an optical disk, a magneto-optical disk, a CD-R, and a magnetic tape, a non-volatile memory card, ROMS, and the like.

The program code that realizes the functions described in this embodiment can be implemented in a wide range of programs or script languages such as assembler, C/C++, Perl, Shell, PHP, Java (registered trademark), and Python.

In the above-described embodiment, the control lines and information lines indicate those that are considered necessary for the explanation and do not necessarily indicate all the control lines and information lines in the product. All configurations may be interconnected.

What is claimed is:

1. An information processing system comprising:
    a management device capable of communicating with a plurality of information processing devices provided at each of a plurality of bases and connected to each other via a communication network, wherein
    each of plurality of the information processing devices include:
        a first processor that executes microservices obtained by dividing functions of an application, and
        a storage device that stores data used by the microservices,
    the management device includes:
        a second processor,
        information of the microservices included in each of the plurality of information processing devices and the data, and
        performance information describing a performance of each of the plurality of information processing devices,
    the second processor is configured to:
        use the data to cause at least one of the plurality of information processing devices to execute at least one microservice of the microservices in a predetermined order to execute the application, and
        move the at least one microservice and the data between at least two of the plurality of the information processing devices based on the information of the microservices and the data possessed by each of the plurality of information processing devices, and the performance information when executing the application includes policy information having a plurality of policies for specifying emphasis performance,
        calculate an estimated execution time for each candidate information processing devices from the plurality of the information processing devices to execute the at least one microservice and an estimated moving time for transferring the at least one microservice and the data between the at least two of the plurality of information processing devices,
        select a policy from the plurality of policies, and
        determine, based on the estimated execution time, the estimated moving time, a number of bases of the plurality of bases where the at least one of the plurality of information processing devices for executing the at least one microservice are arranged and emphasis matters based on the policy for each combination of the candidate information processing devices, a combination of the at least two of the plurality of information processing devices.

2. The information processing system according to claim 1, wherein
    the policy includes response emphasis policy for emphasizing a number of the at least one of the plurality of information processing devices for executing the at least one microservice.

3. The information processing system according to claim 1, wherein
    the policy includes a processor neck emphasis policy which emphasizes the estimated execution time.

4. The information processing system according to claim 1, wherein
    the policy includes moving a time emphasis policy for emphasizing the estimated moving time.

5. The information processing system according to claim 1, wherein the policy includes:
    a response emphasis policy for emphasizing the at least one of the plurality of information processing devices for executing the at least one microservice;
    a processor neck emphasis policy for emphasizing the estimated execution time; and
    a moving time emphasis policy for emphasizing the estimated moving time.

6. An information processing system comprising:
    a management device capable of communicating with a plurality of information processing devices provided at each of a plurality of bases and connected to each other via a communication network, wherein
    each of plurality of the information processing devices include
        a first processor that executes microservices obtained by dividing functions of an application, and
        a storage device that stores data used by the microservices,
    the management device includes
        a second processor,
        information of the microservices included in of the plurality of information processing devices and the data, and performance information describing a performance of each of the plurality of information processing devices, the second processor is configured to:
use the data to cause at least one of the plurality of information processing devices to execute at least one microservice of the microservices in a predetermined order to execute the application, and
move the at least one microservice and the data between at least two of the plurality of the information processing devices based on the information of the microservices and the data possessed by each of the plurality of information processing devices, and the performance information when executing the application,
calculate an estimated execution power consumption for each candidate information processing devices from the plurality of the information processing devices to execute the at least one microservice and an estimated moving power consumption for transferring the at least one microservice and the data between the at least two of the plurality of information processing devices, and
move, based on the estimated execution power consumption and the estimated moving power consumption, an estimated total execution power consumption for each combination of the candidate information processing devices is calculated, and based on the estimated total execution power consumption, the at least one microservice and the data.

7. An information processing system comprising:
a management device capable of communicating with a plurality of information processing devices provided at each of a plurality of bases and connected to each other via a communication network, wherein
each of plurality of the information processing devices include:
a first processor that executes microservices obtained by dividing functions of an application, and
a storage device that stores data used by the microservices, the management device includes:
a second processor,
information of the microservices included in each of the plurality of information processing devices and the data, and
performance information describing a performance of each of the plurality of information processing devices,
the second processor is configured to:
use the data to cause at least one of the plurality of information processing devices to execute at least two microservices of the microservices in a predetermined order to execute the application, and
move the at least two microservices and the data between at least two of the plurality of the information processing devices based on the information of the microservices and the data possessed by each of the plurality of information processing devices, and the performance information when executing the application includes policy information having a plurality of policies for specifying emphasis performance,
calculate an estimated execution time for each candidate information processing devices from the plurality of the information processing devices to execute the at least two microservices and an estimated moving time for transferring the at least two microservices and the data between the at least two of the plurality of information processing devices,
select a policy from the plurality of policies, and
determine, based on the estimated execution time, the estimated moving time, a number of bases of the plurality of bases where the at least one of the plurality of information processing devices for executing the at least two microservices are arranged and emphasis matters based on the policy for each combination of the candidate information processing devices, a combination of the at least two of the plurality of information processing devices.

* * * * *